US012800729B2

(12) United States Patent
Zhang et al.

(10) Patent No.: US 12,800,729 B2
(45) Date of Patent: *Nov. 17, 2026

(54) LIDAR WITH LARGE DYNAMIC RANGE

(71) Applicant: Innovusion, Inc., Sunnyvale, CA (US)

(72) Inventors: Rui Zhang, Palo Alto, CA (US); Yimin Li, Cupertino, CA (US); Junwei Bao, Los Altos, CA (US)

(73) Assignee: SEYOND, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,255

(22) Filed: Jul. 26, 2022

(65) Prior Publication Data

US 2022/0357432 A1 Nov. 10, 2022

Related U.S. Application Data

(63) Continuation of application No. 16/165,695, filed on Oct. 19, 2018, now Pat. No. 11,460,554.
(Continued)

(51) Int. Cl.
*G01S 7/481* (2006.01)
*G01S 7/48* (2006.01)
(Continued)

(52) U.S. Cl.
CPC .......... *G01S 7/4818* (2013.01); *G01S 7/4808* (2013.01); *G01S 7/484* (2013.01); *G01S 7/4865* (2013.01);
(Continued)

(58) Field of Classification Search
CPC ...... G01S 7/4818; G01S 7/4808; G01S 7/484; G01S 7/4865; G01S 7/499; G01S 17/10;
(Continued)

(56) References Cited

U.S. PATENT DOCUMENTS 3,897,150 A 7/1975 Bridges et al.
4,464,048 A 8/1984 Farlow
(Continued)

FOREIGN PATENT DOCUMENTS

CN 1677050 A 10/2005
CN 102460209 A 5/2012
(Continued)

OTHER PUBLICATIONS

Wikipedia contributors. (Mar. 7, 2024). Pulse-repetition frequency. In Wikipedia, The Free Encyclopedia. Retrieved 13:15, Jun. 15, 2024, from https://en.wikipedia.org/w/index.php?title=Pulse-repetition_frequency&oldid=1212393769 (Year: 2024).*
(Continued)

*Primary Examiner* — Isam A Alsomiri
*Assistant Examiner* — Sanjida Naser
(74) *Attorney, Agent, or Firm* — MASCHOFF BRENNAN; Ran Pang; Liang Huang

(57) ABSTRACT

A method for expanding a dynamic range of a light detection and ranging (LiDAR) system is provided. The method comprises transmitting, using a light source of the LiDAR system, a sequence of pulse signals consisting of two or more increasingly stronger pulse signals. The method further comprises receiving, using a light detector of the LiDAR system, one or more returned pulse signals corresponding to the transmitted sequence of pulse signals. The one or more returned pulse signals are above the noise level of the light detector. The method further comprises selecting a returned pulse signal within the dynamic range of the light detector, identifying a transmitted pulse signal of the transmitted sequence that corresponds to the selected returned pulse signal, and calculating a distance based on the selected returned signal and the identified transmitted signal.

32 Claims, 12 Drawing Sheets

Related U.S. Application Data

(60) Provisional application No. 62/574,679, filed on Oct. 19, 2017.

(51) Int. Cl.

| | |
|---|---|
| ***G01S 7/484*** | (2006.01) |
| ***G01S 7/4865*** | (2020.01) |
| ***G01S 7/499*** | (2006.01) |
| ***G01S 17/10*** | (2020.01) |
| ***G02B 27/14*** | (2006.01) |
| ***H01S 3/00*** | (2006.01) |
| ***H01S 3/067*** | (2006.01) |
| ***H01S 3/30*** | (2006.01) |

(52) U.S. Cl.
CPC .............. *G01S 7/499* (2013.01); *G01S 17/10* (2013.01); *G02B 27/14* (2013.01); *H01S 3/005* (2013.01); *H01S 3/06783* (2013.01); *H01S 3/302* (2013.01); *H01S 3/06758* (2013.01)

(58) Field of Classification Search
CPC ....... G01S 7/4868; G01S 7/487; G02B 27/14; H01S 3/005; H01S 3/06783; H01S 3/302; H01S 3/06758
See application file for complete search history.

(56) References Cited

U.S. PATENT DOCUMENTS

| | | | | |
|---|---|---|---|---|
| 4,923,263 | A | 5/1990 | Johnson | |
| 5,006,721 | A | 4/1991 | Cameron et al. | |
| 5,157,451 | A | 10/1992 | Taboada et al. | |
| 5,319,434 | A | 6/1994 | Croteau et al. | |
| 5,369,661 | A | 11/1994 | Yamaguchi et al. | |
| 5,442,358 | A | 8/1995 | Keeler et al. | |
| 5,546,188 | A | 8/1996 | Wangler et al. | |
| 5,579,153 | A | 11/1996 | Laming et al. | |
| 5,657,077 | A | 8/1997 | Deangelis et al. | |
| 5,793,491 | A | 8/1998 | Wangler et al. | |
| 5,838,239 | A | 11/1998 | Stern et al. | |
| 5,864,391 | A | 1/1999 | Hosokawa et al. | |
| 5,926,259 | A | 7/1999 | Bamberger et al. | |
| 5,936,756 | A | 8/1999 | Nakajima | |
| 6,163,378 | A | 12/2000 | Khoury | |
| 6,317,202 | B1 | 11/2001 | Hosokawa et al. | |
| 6,593,582 | B2 | 7/2003 | Lee et al. | |
| 6,594,000 | B2 | 7/2003 | Green et al. | |
| 6,650,404 | B1 | 11/2003 | Crawford | |
| 6,950,733 | B2 | 9/2005 | Stopczynski | |
| 7,128,267 | B2 | 10/2006 | Reichenbach et al. | |
| 7,202,941 | B2 | 4/2007 | Munro | |
| 7,345,271 | B2 | 3/2008 | Boehlau et al. | |
| 7,440,084 | B2 | 10/2008 | Kane | |
| 7,440,175 | B2 | 10/2008 | Di et al. | |
| 7,489,865 | B2 | 2/2009 | Varshineya et al. | |
| 7,576,837 | B2 | 8/2009 | Liu et al. | |
| 7,830,527 | B2 | 11/2010 | Chen et al. | |
| 7,835,068 | B1 | 11/2010 | Brooks et al. | |
| 7,847,235 | B2 | 12/2010 | Krupkin et al. | |
| 7,936,448 | B2 | 5/2011 | Albuquerque et al. | |
| 7,969,558 | B2 | 6/2011 | Hall | |
| 7,982,861 | B2 | 7/2011 | Abshire et al. | |
| 8,072,582 | B2 | 12/2011 | Meneely | |
| 8,471,895 | B2 | 6/2013 | Banks | |
| 8,736,818 | B2 | 5/2014 | Weimer et al. | |
| 8,749,764 | B2 | 6/2014 | Hsu | |
| 8,812,149 | B2 | 8/2014 | Doak | |
| 8,994,928 | B2 | 3/2015 | Shiraishi | |
| 9,048,616 | B1 | 6/2015 | Robinson | |
| 9,065,243 | B2 | 6/2015 | Asobe et al. | |
| 9,086,273 | B1 | 7/2015 | Gruver et al. | |
| 9,194,701 | B2 | 11/2015 | Bosch | |
| 9,255,790 | B2 | 2/2016 | Zhu | |
| 9,300,321 | B2 | 3/2016 | Zalik et al. | |
| 9,304,316 | B2 | 4/2016 | Weiss et al. | |
| 9,316,724 | B2 | 4/2016 | Gehring et al. | |
| 9,354,485 | B2 | 5/2016 | Fermann et al. | |
| 9,510,505 | B2 | 12/2016 | Halloran et al. | |
| 9,575,184 | B2 | 2/2017 | Gilliland et al. | |
| 9,605,998 | B2 | 3/2017 | Nozawa | |
| 9,621,876 | B2 | 4/2017 | Federspiel | |
| 9,638,799 | B2 | 5/2017 | Goodwin et al. | |
| 9,696,426 | B2 | 7/2017 | Zuk | |
| 9,702,966 | B2 | 7/2017 | Batcheller et al. | |
| 9,804,264 | B2 | 10/2017 | Villeneuve et al. | |
| 9,810,786 | B1 | 11/2017 | Welford et al. | |
| 9,812,838 | B2 | 11/2017 | Villeneuve et al. | |
| 9,823,353 | B2 | 11/2017 | Eichenholz et al. | |
| 9,857,468 | B1 | 1/2018 | Eichenholz et al. | |
| 9,869,754 | B1 | 1/2018 | Campbell et al. | |
| 9,879,990 | B2 | 1/2018 | Klepsvik et al. | |
| 9,880,263 | B2 | 1/2018 | Droz et al. | |
| 9,880,278 | B2 | 1/2018 | Uffelen et al. | |
| 9,885,778 | B2 | 2/2018 | Dussan | |
| 9,897,689 | B2 | 2/2018 | Dussan | |
| 9,915,726 | B2 | 3/2018 | Bailey et al. | |
| 9,927,915 | B2 | 3/2018 | Frame et al. | |
| 9,958,545 | B2 | 5/2018 | Eichenholz et al. | |
| 10,007,001 | B1 | 6/2018 | LaChapelle et al. | |
| 10,012,732 | B2 | 7/2018 | Eichenholz et al. | |
| 10,042,159 | B2 | 8/2018 | Dussan et al. | |
| 10,061,019 | B1 | 8/2018 | Campbell et al. | |
| 10,073,166 | B2 | 9/2018 | Dussan | |
| 10,078,133 | B2 | 9/2018 | Dussan | |
| 10,094,925 | B1 | 10/2018 | LaChapelle | |
| 10,157,630 | B2 | 12/2018 | Vaughn et al. | |
| 10,191,155 | B2 | 1/2019 | Curatu | |
| 10,215,847 | B2 | 2/2019 | Scheim et al. | |
| 10,267,898 | B2 | 4/2019 | Campbell et al. | |
| 10,295,656 | B1 | 5/2019 | Li et al. | |
| 10,310,058 | B1 | 6/2019 | Campbell et al. | |
| 10,324,170 | B1 | 6/2019 | Enberg, Jr. et al. | |
| 10,324,185 | B2 | 6/2019 | McWhirter et al. | |
| 10,393,877 | B2 | 8/2019 | Hall et al. | |
| 10,429,495 | B1 | 10/2019 | Wang et al. | |
| 10,444,356 | B2 | 10/2019 | Wu et al. | |
| 10,451,716 | B2 | 10/2019 | Hughes et al. | |
| 10,466,342 | B1 | 11/2019 | Zhu et al. | |
| 10,502,831 | B2 | 12/2019 | Eichenholz | |
| 10,509,112 | B1 | 12/2019 | Pan | |
| 10,520,602 | B2 | 12/2019 | Villeneuve et al. | |
| 10,557,840 | B2 | 2/2020 | Eichenholz et al. | |
| 10,557,923 | B2 | 2/2020 | Watnik et al. | |
| 10,557,940 | B2 * | 2/2020 | Eichenholz | G01S 7/4804 |
| 10,571,567 | B2 | 2/2020 | Campbell et al. | |
| 10,578,720 | B2 | 3/2020 | Hughes et al. | |
| 10,591,600 | B2 | 3/2020 | Villeneuve et al. | |
| 10,627,491 | B2 | 4/2020 | Hall et al. | |
| 10,641,872 | B2 | 5/2020 | Dussan et al. | |
| 10,663,564 | B2 | 5/2020 | LaChapelle | |
| 10,663,585 | B2 | 5/2020 | McWhirter | |
| 10,663,596 | B2 | 5/2020 | Dussan et al. | |
| 10,684,360 | B2 | 6/2020 | Campbell | |
| 10,732,281 | B2 | 8/2020 | LaChapelle | |
| 10,908,262 | B2 | 2/2021 | Dussan | |
| 10,908,265 | B2 | 2/2021 | Dussan | |
| 10,908,268 | B2 | 2/2021 | Zhou et al. | |
| 10,969,475 | B2 | 4/2021 | Li et al. | |
| 10,983,218 | B2 | 4/2021 | Hall et al. | |
| 11,002,835 | B2 | 5/2021 | Pan et al. | |
| 11,009,605 | B2 | 5/2021 | Li et al. | |
| 11,016,192 | B2 | 5/2021 | Pacala et al. | |
| 11,194,048 | B1 | 12/2021 | Burbank et al. | |
| 2002/0136251 | A1 | 9/2002 | Green et al. | |
| 2004/0135992 | A1 | 7/2004 | Munro | |
| 2005/0033497 | A1 | 2/2005 | Stopczynski | |
| 2005/0190424 | A1 | 9/2005 | Reichenbach et al. | |
| 2005/0195383 | A1 | 9/2005 | Breed et al. | |
| 2006/0071846 | A1 | 4/2006 | Yanagisawa et al. | |
| 2006/0132752 | A1 | 6/2006 | Kane | |
| 2007/0091948 | A1 | 4/2007 | Di et al. | |
| 2007/0216995 | A1 | 9/2007 | Bollond et al. | |
| 2008/0174762 | A1 | 7/2008 | Liu et al. | |

(56) References Cited

U.S. PATENT DOCUMENTS

| | | | |
|---|---|---|---|
| 2008/0193135 | A1 | 8/2008 | Du et al. |
| 2009/0010644 | A1 | 1/2009 | Varshneya et al. |
| 2009/0051926 | A1 | 2/2009 | Chen |
| 2009/0059201 | A1 | 3/2009 | Willner et al. |
| 2009/0067453 | A1 | 3/2009 | Mizuuchi et al. |
| 2009/0147239 | A1 | 6/2009 | Zhu |
| 2009/0262760 | A1 | 10/2009 | Krupkin et al. |
| 2009/0316134 | A1 | 12/2009 | Michael et al. |
| 2010/0006760 | A1 | 1/2010 | Lee et al. |
| 2010/0020306 | A1 | 1/2010 | Hall |
| 2010/0020377 | A1 | 1/2010 | Brochers et al. |
| 2010/0027602 | A1 | 2/2010 | Abshire et al. |
| 2010/0045965 | A1 | 2/2010 | Meneely |
| 2010/0053715 | A1 | 3/2010 | O'Neill et al. |
| 2010/0128109 | A1 | 5/2010 | Banks |
| 2010/0271614 | A1 | 10/2010 | Albuquerque et al. |
| 2011/0181864 | A1 | 7/2011 | Schmitt et al. |
| 2012/0038903 | A1* | 2/2012 | Weimer .................. G01C 3/08 250/208.2 |
| 2012/0124113 | A1 | 5/2012 | Zalik et al. |
| 2012/0221142 | A1 | 8/2012 | Doak |
| 2013/0083316 | A1* | 4/2013 | Mimeault ................ G01V 8/20 356/73 |
| 2013/0107016 | A1 | 5/2013 | Federspeil |
| 2013/0116971 | A1 | 5/2013 | Retkowski et al. |
| 2013/0241761 | A1 | 9/2013 | Cooper et al. |
| 2013/0293867 | A1 | 11/2013 | Hsu et al. |
| 2013/0293946 | A1 | 11/2013 | Fermann et al. |
| 2013/0329279 | A1 | 12/2013 | Nati et al. |
| 2013/0342822 | A1 | 12/2013 | Shiraishi |
| 2014/0078514 | A1 | 3/2014 | Zhu |
| 2014/0104594 | A1 | 4/2014 | Gammenthaler |
| 2014/0347650 | A1 | 11/2014 | Bosch |
| 2014/0350836 | A1 | 11/2014 | Stettner et al. |
| 2015/0078123 | A1 | 3/2015 | Batcheller et al. |
| 2015/0084805 | A1 | 3/2015 | Dawber |
| 2015/0109603 | A1 | 4/2015 | Kim et al. |
| 2015/0116692 | A1 | 4/2015 | Zuk et al. |
| 2015/0139259 | A1 | 5/2015 | Robinson |
| 2015/0158489 | A1 | 6/2015 | Oh et al. |
| 2015/0338270 | A1 | 11/2015 | Williams et al. |
| 2015/0355327 | A1 | 12/2015 | Goodwin et al. |
| 2016/0003946 | A1 | 1/2016 | Gilliland et al. |
| 2016/0047896 | A1 | 2/2016 | Dussan |
| 2016/0047900 | A1 | 2/2016 | Dussan |
| 2016/0061655 | A1 | 3/2016 | Nozawa |
| 2016/0061935 | A1 | 3/2016 | Mccloskey et al. |
| 2016/0100521 | A1 | 4/2016 | Halloran et al. |
| 2016/0117048 | A1 | 4/2016 | Frame et al. |
| 2016/0172819 | A1 | 6/2016 | Ogaki |
| 2016/0178736 | A1 | 6/2016 | Chung |
| 2016/0226210 | A1 | 8/2016 | Zayhowski et al. |
| 2016/0245902 | A1 | 8/2016 | Natnik |
| 2016/0291134 | A1 | 10/2016 | Droz et al. |
| 2016/0313445 | A1 | 10/2016 | Bailey et al. |
| 2016/0327646 | A1 | 11/2016 | Scheim et al. |
| 2017/0003116 | A1 | 1/2017 | Yee et al. |
| 2017/0153319 | A1 | 6/2017 | Villeneuve et al. |
| 2017/0219695 | A1* | 8/2017 | Hall ........................ G01S 17/42 |
| 2017/0242104 | A1 | 8/2017 | Dussan |
| 2017/0269209 | A1* | 9/2017 | Hall ........................ G01S 17/10 |
| 2017/0299721 | A1 | 10/2017 | Eichenholz et al. |
| 2017/0307738 | A1 | 10/2017 | Schwarz et al. |
| 2017/0365105 | A1 | 12/2017 | Rao et al. |
| 2018/0040171 | A1 | 2/2018 | Kundu et al. |
| 2018/0050704 | A1 | 2/2018 | Tascione et al. |
| 2018/0069367 | A1 | 3/2018 | Villeneuve et al. |
| 2018/0152691 | A1 | 5/2018 | Pacala et al. |
| 2018/0156896 | A1 | 6/2018 | O'Keeffe |
| 2018/0158471 | A1 | 6/2018 | Vaughn et al. |
| 2018/0164439 | A1 | 6/2018 | Droz et al. |
| 2018/0188355 | A1 | 7/2018 | Bao et al. |
| 2018/0188357 | A1 | 7/2018 | Li et al. |
| 2018/0188358 | A1 | 7/2018 | Li et al. |
| 2018/0188371 | A1 | 7/2018 | Bao et al. |
| 2018/0210084 | A1 | 7/2018 | Zwölfer et al. |
| 2018/0275274 | A1 | 9/2018 | Bao et al. |
| 2018/0284241 | A1 | 10/2018 | Campbell et al. |
| 2018/0284242 | A1 | 10/2018 | Campbell |
| 2018/0284286 | A1 | 10/2018 | Eichenholz et al. |
| 2018/0329060 | A1 | 11/2018 | Pacala et al. |
| 2018/0359460 | A1 | 12/2018 | Pacala et al. |
| 2019/0025428 | A1 | 1/2019 | et al. |
| 2019/0107607 | A1 | 4/2019 | Danziger |
| 2019/0107623 | A1 | 4/2019 | Campbell et al. |
| 2019/0120942 | A1 | 4/2019 | Zhang et al. |
| 2019/0120962 | A1 | 4/2019 | Gimpel et al. |
| 2019/0154804 | A1 | 5/2019 | Eichenholz |
| 2019/0154807 | A1 | 5/2019 | Steinkogler et al. |
| 2019/0212416 | A1 | 7/2019 | Li et al. |
| 2019/0250254 | A1 | 8/2019 | Campbell et al. |
| 2019/0257924 | A1 | 8/2019 | Li et al. |
| 2019/0265334 | A1 | 8/2019 | Zhang et al. |
| 2019/0265336 | A1 | 8/2019 | Zhang et al. |
| 2019/0265337 | A1 | 8/2019 | Zhang et al. |
| 2019/0265339 | A1 | 8/2019 | Zhang et al. |
| 2019/0277952 | A1 | 9/2019 | Beuschel et al. |
| 2019/0310368 | A1 | 10/2019 | LaChapelle |
| 2019/0369215 | A1 | 12/2019 | Wang et al. |
| 2019/0369258 | A1 | 12/2019 | Hall et al. |
| 2019/0383915 | A1 | 12/2019 | Li et al. |
| 2020/0142070 | A1 | 5/2020 | Hall et al. |
| 2020/0256964 | A1 | 8/2020 | Campbell et al. |
| 2020/0284906 | A1 | 9/2020 | Eichenholz et al. |
| 2020/0319310 | A1 | 10/2020 | Hall et al. |
| 2020/0400798 | A1 | 12/2020 | Rezk et al. |
| 2021/0088630 | A9 | 3/2021 | Zhang |

FOREIGN PATENT DOCUMENTS

| | | | |
|---|---|---|---|
| CN | 103576162 | A | 2/2014 |
| CN | 104412120 | A | 3/2015 |
| CN | 204758260 | U | 11/2015 |
| CN | 204885804 | U | 12/2015 |
| CN | 105988119 | A | 10/2016 |
| CN | 107085218 | A | 8/2017 |
| CN | 108132472 | A | 6/2018 |
| CN | 207457508 | U | 6/2018 |
| CN | 207557465 | U | 6/2018 |
| CN | 208314210 | U | 1/2019 |
| CN | 208421228 | U | 1/2019 |
| CN | 208705506 | U | 4/2019 |
| CN | 106597471 | B | 5/2019 |
| CN | 209280923 | U | 8/2019 |
| CN | 108445468 | B | 11/2019 |
| CN | 110031823 | B | 3/2020 |
| CN | 108089201 | B | 4/2020 |
| CN | 108594206 | B | 4/2020 |
| CN | 109116331 | B | 4/2020 |
| CN | 109917408 | B | 4/2020 |
| CN | 109116366 | B | 5/2020 |
| CN | 109116367 | B | 5/2020 |
| CN | 110031822 | B | 5/2020 |
| CN | 211655309 | U | 10/2020 |
| CN | 109188397 | B | 11/2020 |
| CN | 109814086 | B | 11/2020 |
| CN | 109917348 | B | 11/2020 |
| CN | 110492856 | B | 11/2020 |
| CN | 110736975 | B | 11/2020 |
| CN | 109725320 | B | 12/2020 |
| CN | 110780284 | B | 12/2020 |
| CN | 110780283 | B | 1/2021 |
| CN | 110784220 | B | 2/2021 |
| CN | 212623082 | U | 2/2021 |
| CN | 110492349 | B | 3/2021 |
| CN | 109950784 | B | 5/2021 |
| CN | 213182011 | U | 5/2021 |
| CN | 213750313 | U | 7/2021 |
| CN | 214151038 | U | 9/2021 |
| CN | 109814082 | B | 10/2021 |
| CN | 113491043 | A | 10/2021 |
| CN | 214795200 | U | 11/2021 |
| CN | 214795206 | U | 11/2021 |
| CN | 214895784 | U | 11/2021 |

(56) References Cited

FOREIGN PATENT DOCUMENTS

| | | | | |
|---|---|---|---|---|
| CN | 214895810 U | | 11/2021 | |
| CN | 215641806 U | | 1/2022 | |
| CN | 112639527 B | | 2/2022 | |
| CN | 215932142 U | | 3/2022 | |
| CN | 112578396 B | | 4/2022 | |
| CN | 115267727 A | | 11/2022 | |
| CN | 223296134 U | | 9/2025 | |
| EP | 0 757 257 A2 | | 2/1997 | |
| EP | 1 237 305 A2 | | 9/2002 | |
| EP | 1 923 721 A1 | | 5/2008 | |
| EP | 2 157 445 A2 | | 2/2010 | |
| EP | 2395368 A1 | * | 12/2011 | G01S 17/10 |
| EP | 2 889 642 A1 | | 7/2015 | |
| GB | 1 427 164 A | | 3/1976 | |
| GB | 2000411 | | 1/1979 | |
| JP | H04366785 A | * | 12/1992 | |
| JP | 2002221574 A | | 8/2002 | |
| JP | 2003167281 A | | 6/2003 | |
| JP | 2005009956 A | | 1/2005 | |
| JP | 2006322759 A | | 11/2006 | |
| JP | 2007144667 A | | 6/2007 | |
| JP | 2008107286 A | | 5/2008 | |
| JP | 2009156666 A | | 7/2009 | |
| JP | 2010035385 A | | 2/2010 | |
| JP | 2010045965 A | | 2/2010 | |
| JP | 2010085316 A | | 4/2010 | |
| JP | 2012026921 A | | 2/2012 | |
| JP | 2016014665 A | | 1/2016 | |
| JP | 2016206610 A | | 12/2016 | |
| JP | 2017-003347 A | | 1/2017 | |
| JP | 2017-138301 A | | 8/2017 | |
| KR | 10-2012-0013515 A | | 2/2012 | |
| KR | 10-2013-0068224 A | | 6/2013 | |
| KR | 10-2018-0107673 A | | 10/2018 | |
| WO | 2014203654 A1 | | 12/2014 | |
| WO | 2017/110417 A1 | | 6/2017 | |
| WO | 2017143217 A1 | | 8/2017 | |
| WO | 2018/125725 A1 | | 7/2018 | |
| WO | 2018/129410 A1 | | 7/2018 | |
| WO | 2018129408 A1 | | 7/2018 | |
| WO | 2018129409 A1 | | 7/2018 | |
| WO | 2018175990 | | 9/2018 | |
| WO | 2018182812 A2 | | 10/2018 | |
| WO | 2019079642 | | 4/2019 | |
| WO | 2019165095 | | 8/2019 | |
| WO | 2019165289 A1 | | 8/2019 | |
| WO | 2019165294 | | 8/2019 | |
| WO | 2020013890 A2 | | 1/2020 | |

OTHER PUBLICATIONS

"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airbome, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
European Office Action, dated Mar. 11, 2024, for EP Application No. 18868896.4, 6 pages.
First Office Action dated Jan. 2, 2024 for Chinese Patent Application No. 201880081927.9, 24 pages.

* cited by examiner

LIDAR WITH LARGE DYNAMIC RANGE

CROSS-REFERENCE TO RELATED APPLICATIONS

This application claims priority to U.S. non-provisional Patent Application Ser. No. 16/165,695, entitled “LIDAR WITH LARGE DYNAMIC RANGE,” filed Oct. 19, 2018, which claims priority to U.S. Provisional Patent Application Serial 62/574,679, entitled “LIDAR WITH LARGE DYNAMIC RANGE,” filed Oct. 19, 2017. The contents of both applications are hereby incorporated by reference in their entireties for all purposes.

This application relates to U.S. Provisional Patent Application No. 62/441,280, entitled “COAXIAL INTERLACED RASTER SCANNING SYSTEM FOR LiDAR,” filed on Dec. 31, 2016, and U.S. Provisional Patent Application No. 62/529,955, entitled “2D SCANNING HIGH PRECISION LiDAR USING COMBINATION OF ROTATING CONCAVE MIRROR AND BEAM STEERING DEVICES,” filed on Jul. 7, 2017, the content of which are hereby incorporated by reference in its entirety for all purposes.

FIELD OF THE INVENTION

The present disclosure generally relates to a light detection and ranging (LiDAR) system and, more specifically, to systems and methods for expanding the dynamic range of a LiDAR system.

BACKGROUND

LiDAR system can be used to measure the distance between an object and the system. Specifically, the system can transmit a signal (e.g., using a light source), record a returned signal (e.g., using photodetectors), and determine the distance by calculating the delay between the returned signal and the transmitted signal. As an example, FIG. 1 depicts a LiDAR system 100 having a transmitter 102 and a receiver 104. The LiDAR system transmits a pulse signal 106, receives a returned signal 108, and calculates the distance to the object 110 accordingly.

The precision of a typical LiDAR system is approximately 3-10 cm, which is limited by the pulse duration of the laser source and the response time of the receivers. Some techniques are used to improve the precision to a few centimeters, for example, by comparing the returned signal with the corresponding original signal (i.e., reference signal). Additional description of improving precision of a LiDAR system is provided in U.S. Provisional Patent Application 62/529,955, “2D SCANNING HIGH PRECISION LiDAR USING COMBINATION OF ROTATING CONCAVE MIRROR AND BEAM STEERING DEVICES,” which is hereby incorporated by reference in its entirety.

A LiDAR system requires a large dynamic range because the power level of a returned signal is inversely proportional to the square of the distance. For example, a returned signal scattered from an object at a distance of 10 meters is usually 100 times stronger than a returned signal scattered from an object at a distance of 100 meters. Further, the scattered light for different objects may differ by hundreds of times or larger. Dynamic range needed for a LiDAR system is usually as large as 10ˆ3-10ˆ4. However, the dynamic range of a typical photodetector used to measure the power of returned signal is only 10ˆ2.

BRIEF SUMMARY

The following presents a simplified summary of one or more examples to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

In accordance with some embodiments, a LiDAR scanning system is provided. The system includes a light source configured to provide a sequence of two or more light pulses (e.g., a sequential pulse train). The two or more light pulses have different peak power and are separated from each other by a certain delay. The order of the sequential pulses follows the rule that the weaker signal comes out earlier than the stronger signal. The system also includes one or more receivers to receive the returning light pulse(s) corresponding to the sequential light pulses. The power ratio between each pair of neighboring pulses of the light source can be as large as the dynamic range of the receivers, e.g., 10ˆ2. Since the peak power of each sequential pulse in the sequential pulse train covers a large range to, but not limited to, 10ˆ4, one of the pulses must return a signal that fits itself comfortably in the receiver’s dynamic range.

In some embodiments, a computer-implemented method for expanding a dynamic range of a light detection and ranging (LiDAR) system comprises: transmitting, using a light source of the LiDAR system, a sequence of pulse signals, wherein the sequence of pulse signals consists of two or more increasingly stronger pulse signals; receiving, a the light detector of the LiDAR system, one or more returned pulse signals corresponding to the transmitted sequence of pulse signals, wherein the one or more returned pulse signals are above the noise level of the light detector; selecting a returned pulse signal from the one or more returned pulse signals, wherein the selected returned pulse signal is within the dynamic range of the light detector; identifying a transmitted pulse signal of the transmitted sequence that corresponds to the selected returned pulse signal; and calculating a distance based on the selected returned signal and the identified transmitted signal.

In some embodiments, a light detection and ranging (LiDAR) system comprises: a memory; a laser system configured to transmit a sequence of pulse signals, wherein the sequence of pulse signals consists of two or more increasingly stronger pulse signals; a light detector configured to receive one or more returned pulse signals corresponding to the transmitted sequence of pulse signals, wherein the one or more returned pulse signals are above the noise level of the light detector; and one or more processors configured to: select a returned pulse signal from the one or more returned pulse signals, wherein the selected returned pulse signal is within the dynamic range of the light detector; identify a transmitted pulse signal of the transmitted sequence that corresponds to the selected returned pulse signal; and calculate a distance based on the selected returned signal and the identified transmitted signal.

DESCRIPTION OF THE FIGURES

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
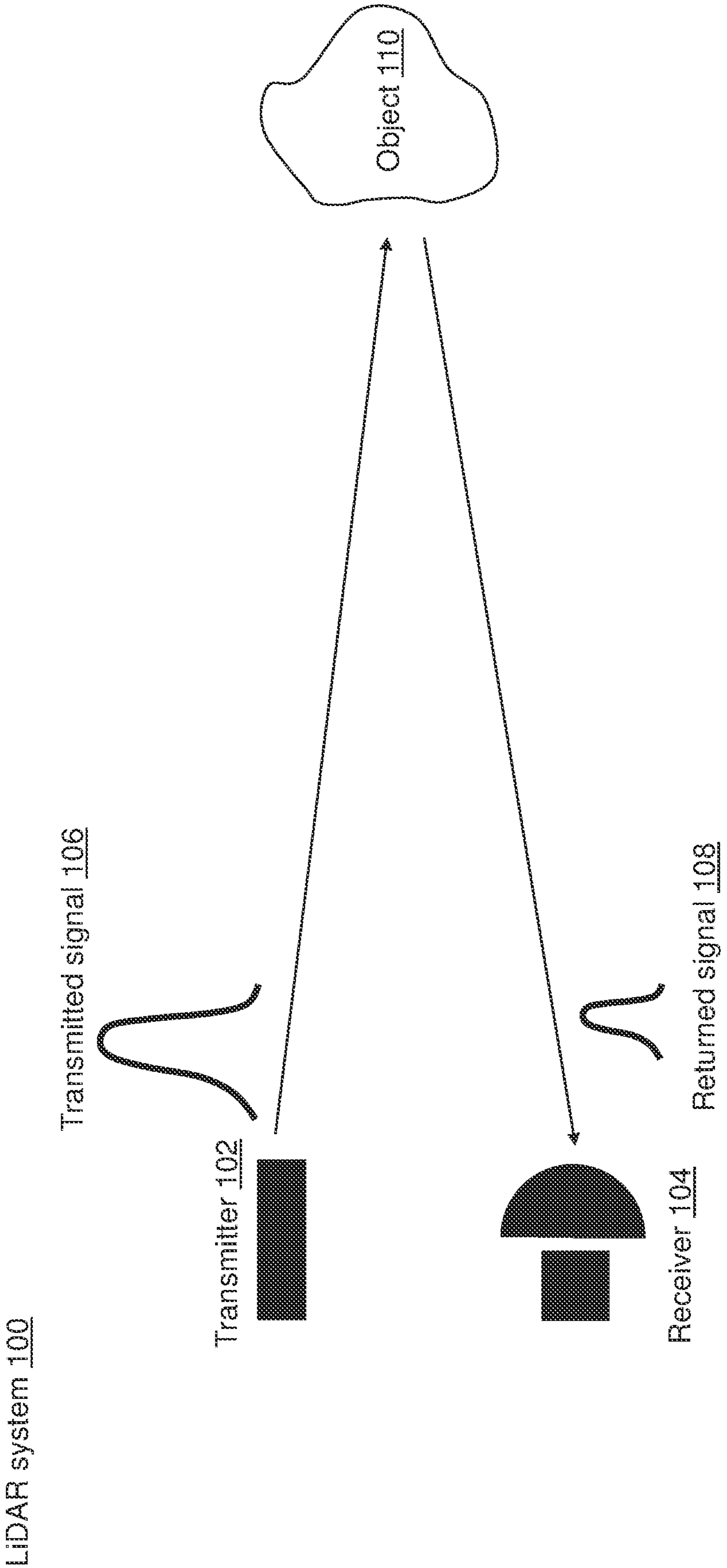
FIG. 1 depicts an exemplary LiDAR system with a light source and a receiver in accordance with some embodiments.

As discussed above, a LiDAR system requires large dynamic range because the power level of returned signal is inversely proportional to the square of the distance. Dynamic range needed for a LiDAR system is usually as large as 10ˆ3-10ˆ4. However, the dynamic range of a typical photodetector used to measure the power of returned signal is only 10ˆ2.

To increase the dynamic range of the system, several techniques can be used. If the laser source is a semiconductor laser, driving current of laser source can be modulated to adjust the output power such that a small signal is sent to detect a nearby object and a large signal is sent to detect a faraway object. However, this technique requires prediction of the environment from previous frames and increases the load of computation and the complexity of the control circuit. Further, this technique cannot be used for some laser sources, for example, Erbium doped fiber laser, the active doping for which has long florescence time of 3-10 milliseconds. The output power from such laser cannot be adjusted from pulse to pulse because the time scale of laser response is usually in the region of a few microseconds. Some other techniques may be applied to such laser including, for example, adjusting the pulse duration of the laser source, tuning the supply voltage of photodetector, and using multiple sets of photodetectors. However, none of these techniques can effectively increase the dynamic range of photodetector from 10ˆ2 to 10ˆ4 and the cost can be high. The present disclosure introduced an efficient and cost-effective method to realize a LiDAR system with a large dynamic range of, but not limited to, 10ˆ4.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Although the following description uses terms "first," "second," etc. to describe various elements, these elements should not be limited by the terms. These terms are only used to distinguish one element from another. For example, a first pulse signal could be termed a second pulse signal, and, similarly, a second pulse signal could be termed a first pulse signal, without departing from the scope of the various described embodiments. The first pulse signal and the second pulse signals are both pulse signals, but they may not be the same pulse signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The present disclosure describes a method to increase the dynamic range of a LiDAR system to (but not limited to) 10ˆ4 using a standard photodetector. A typical photodetector has a dynamic range, where the amplified electronic signal is linearly proportional to the incident power, up to 10ˆ2. However, to determine the distance between an object and the LiDAR system with a precision of a few centimeters, the receiver should be able to measure the returned signal with a dynamic range of 10ˆ4. In order to expand the dynamic range of the LiDAR system, sequential pulses of light source are steered to illuminate objects in a field-of-view. The returned signals are measured by a typical photodetector, as discussed below.

Figure 2:
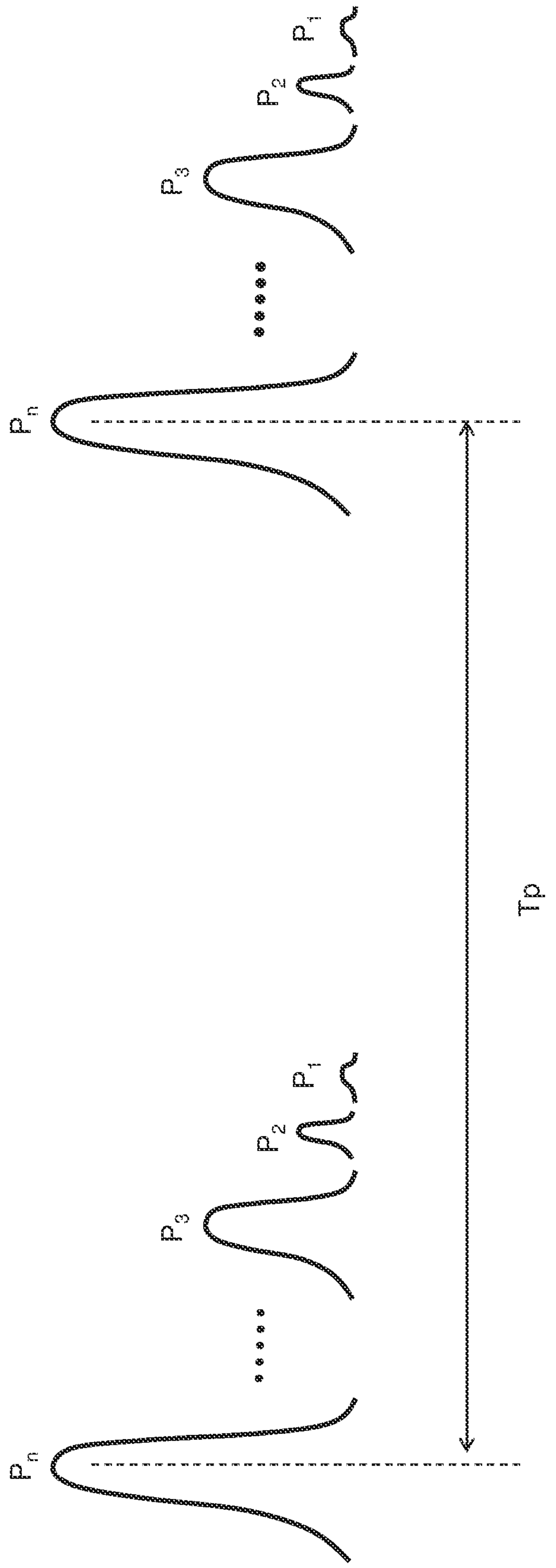
FIG. 2 depicts exemplary sequences of pulse signals from a light source in accordance with some embodiments.

FIG. 2 illustrates two exemplary sequences of pulse signals (i.e., two sequential pulse trains) generated by a light source. Each of the two sequences of pulse signals includes two or more sequential light pulse signals. In each sequence, the peak power of each pulse signal is different, and neighboring pulses are separated by a certain delay. In each sequence, the order of the sequential pulse signals follows the rule that a weaker signal comes out earlier than a stronger signal. As depicted in FIG. 2, each exemplary sequential pulse train includes a sequence of pulse signals $P_1, P_2, \ldots, P_n$. $T_p$ stands for the period between the sequences of pulse signals and is the inverse of the repetition rate of the laser. The pulse signals in the sequential pulse train may have the same pulse duration or different pulse durations. The delays between neighboring pulse signals (e.g., between $P_1$ and $P_2$, between $P_2$ and $P_3$) may be the same or different.

Figure 3A:
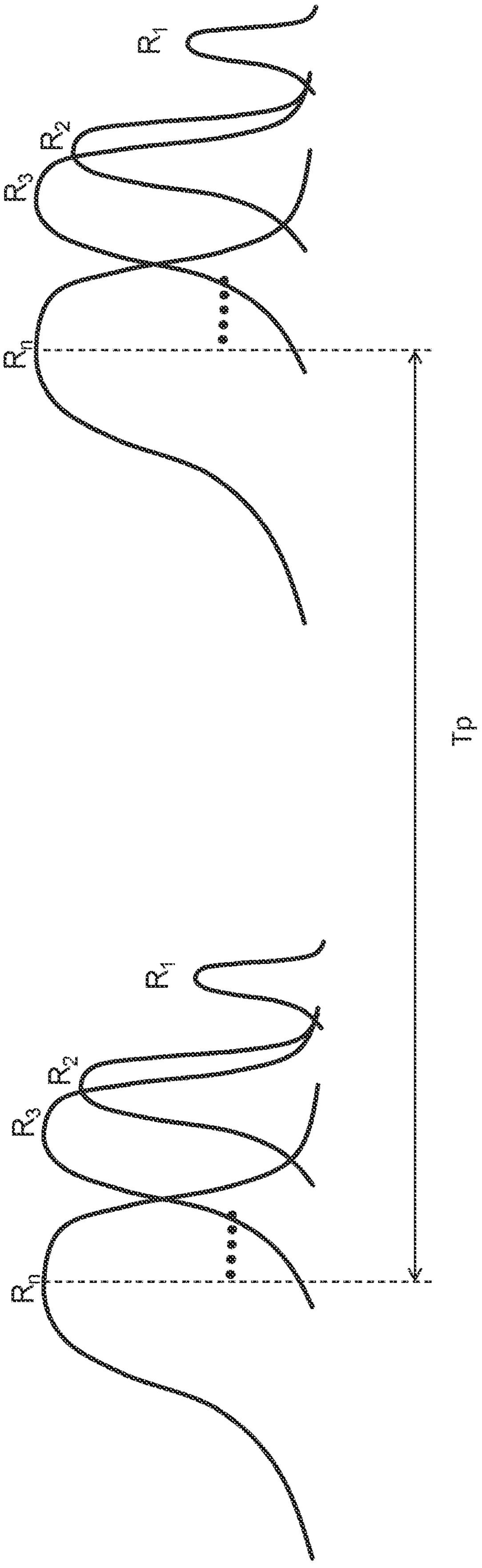
FIG. 3A depicts received returned signals that scattered from a relatively nearby object in accordance with some embodiments.
Figure 3B:
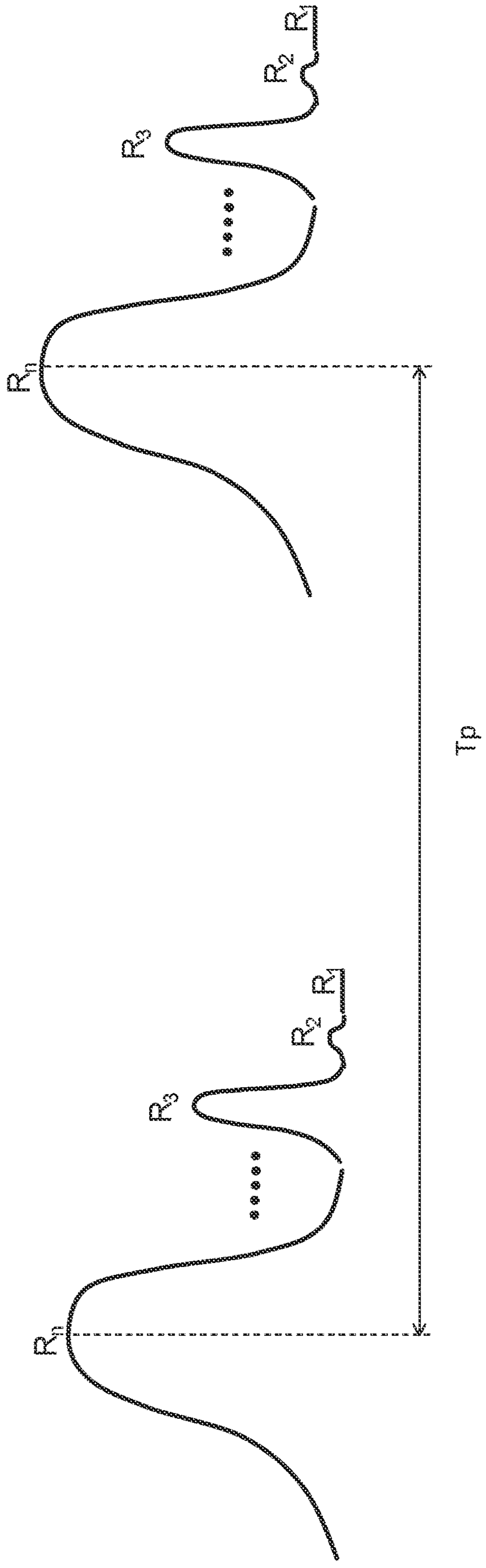
FIG. 3B depicts received returned signals that scattered from a relatively mid-range object in accordance with some embodiments.
Figure 3C:
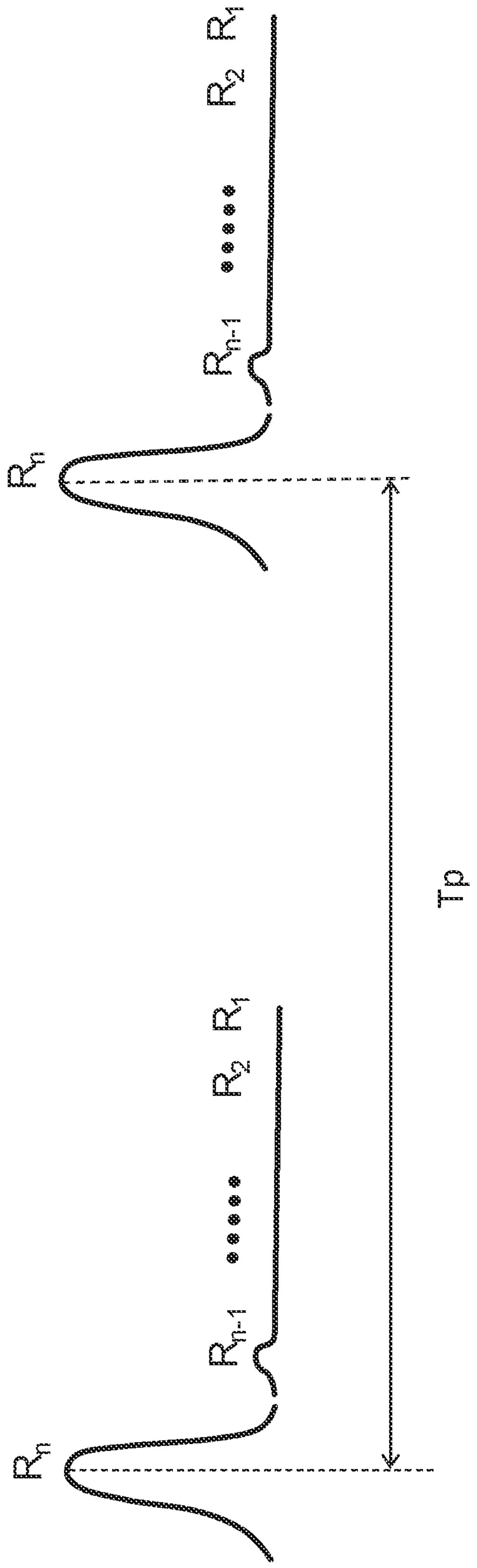
FIG. 3C depicts received returned signals that scattered from a relatively faraway object in accordance with some embodiments.

FIGS. 3A-C illustrate exemplary scenarios in which a LiDAR system transmits two sequential pulse trains and receives two groups of returned signals scattered from a relatively nearby object, a relatively mid-range object, and a relatively faraway object, respectively. The received returned signals as measured by a typical photodetector, noted as $R_1, R_2, \ldots, R_n$, respectively correspond to $P_1, P_2, \ldots, P_n$.

With reference to FIG. 3A, a transmitted sequential pulse trains is scattered by a nearby object, resulting in a group of returned signals $R_1, R_2, \ldots, R_n$. Due to the short distance and therefore strong returned signals, only $R_1$ stays within the dynamic range of the photodetector and all the other signals are saturated. The saturated signals are discarded later by software processing the measured returned signals. Accordingly, $R_1$ (together with $P_1$) is used to determine the distance between the object and LiDAR system.

With reference to FIG. 3B, a transmitted sequential pulse trains is scattered by a mid-range object, resulting in a group of measured returned signals $R_1, R_2, \ldots, R_n$. Some returned signals (e.g. $R_1$ corresponding to $P_1$) hide below the noise level of photodetector and cannot be analyzed. Some returned signals (e.g. $R_n$ corresponding to $P_n$) saturate the photodetector and are discarded later. The returned signal of a mid-range pulse ($R_3$ corresponding to $P_3$) stays in the dynamic range of the photodetector and is used to analyze the distance between the mid-range object and the LiDAR system.

With reference to FIG. 3C, a transmitted sequential pulse trains is scattered by a faraway object, resulting in a group of measured returned signals $R_1, R_2, \ldots, R_n$. Due to the long distance and therefore weak returned signals, only $R_n$ stays within the dynamic range of the photodetector and all the other signals are below the noise level of the system. Thus, $R_n$ is used to analyze the distance between the faraway object and the LiDAR system.

Figure 4:
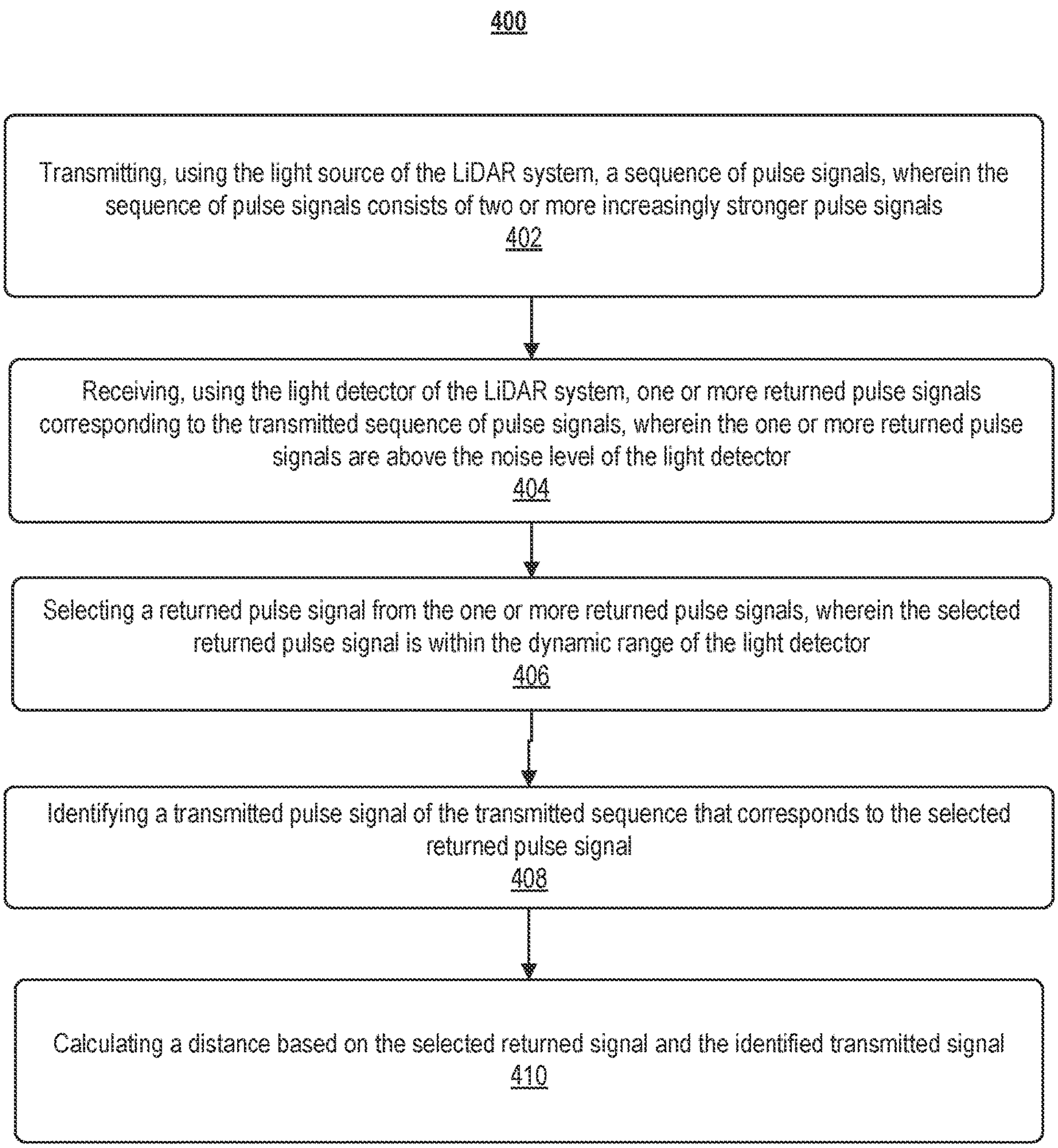
FIG. 4 depicts an exemplary process for expanding a dynamic range of a LiDAR system in accordance with some embodiments.

FIG. 4 illustrates process 400 for providing a LiDAR system with a large dynamic range, according to various examples. Process 400 is performed, for example, using a LiDAR system having a light source (e.g., a fiber laser), a light detector, a memory, and one or more processors. While portions of process 400 are described herein as being performed by particular components of a LiDAR system, it will be appreciated that process 400 is not so limited. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 402, a LiDAR system transmits, using a light source of the LiDAR system (e.g., a fiber laser), a sequence of pulse signals (e.g., a sequential pulse train $P_1, P_2, \ldots, P_n$ in FIG. 2). The sequence of pulse signals includes two or more increasingly stronger pulse signals. For example, as depicted in FIG. 2, $P_1$ is transmitted before $P_2$ and the power level of $P_1$ is lower than the power level of $P_2$. In some examples, the power ratio between two neighboring pulse signals (e.g., $P_1$ and $P_2$) of the sequence of pulse signals does not exceed the dynamic range of the detector.

At block 404, the LiDAR system receives, using a light detector of the LiDAR system, one or more returned pulse signals corresponding to the transmitted sequence of pulse signals. The one or more returned pulse signals are above the noise level of the light detector. For example, as depicted in FIG. 3A, the LiDAR system receives n returned pulse signals ($R_1, R_2, \ldots, R_n$) corresponding to the transmitted sequence of pulse signals ($P_1, P_2, \ldots, P_n$). Further, all of the n returned pulse signals ($R_1, R_2, \ldots, R_n$) are over the noise level of the light detector. As another example, in FIG. 3B, the LiDAR system receives fewer than n returned pulse signals that are above the noise level of the light detector, as the first returned signal $R_1$ received by the LiDAR system hides below the noise level of photodetector and cannot be analyzed.

At block 406, the LiDAR system selects a returned pulse signal from the one or more returned pulse signals. The selected returned pulse signal is within the dynamic range of the light detector (e.g., not saturated and not below the noise level of the light detector). For example, as depicted in FIG. 3B, the LiDAR system selects $R_3$, which is within the dynamic range of the photodetector, to be used to analyze the distance between the mid-range object and the LiDAR system. In this example, $R_n$ (corresponding to $P_n$) is a saturated signal and thus is not selected.

In some examples, to select a returned pulse signal, the LiDAR system identifies the last received pulse signal of the returned signals that is not a saturated signal. For example, with reference to FIG. 3B, the system may identify $R_3$ as the last received pulse signal that is not a saturated signal because $R_4$-$R_n$ are all saturated signals. Accordingly, $R_3$ is selected.

In some examples, there is only one returned pulse signal corresponding to the transmitted sequence of pulse signals that is within the dynamic range of the light detector. Accordingly, that one returned pulse signal is selected.

In some examples, the LiDAR system transmits a plurality of sequences of pulse signals and, for each sequence of the plurality of sequences of pulse signals, the system receives at least one returned pulse signal within the dynamic range of the light detector. For example, if the system transmits two sequential pulse trains (as depicted in FIG. 2) and the first train is scattered by a nearby object and the second train is scattered by a faraway object, the system may be able to receive returned pulse signal(s) within the dynamic range of the light detector for both the first train and the second train, as illustrated in FIGS. 3A and 3C.

In some examples, the system may determine that all of the returned pulse signals are saturated signals (i.e., none of the returned pulse signals are within the dynamic range of the light detector). This may indicate that the transmitted sequence of pulse signals (e.g., $P_1, P_2, \ldots, P_n$ in FIG. 2) is ill-suited for the environment being surveyed. Accordingly, the LiDAR system can be adjusted such that a different sequence of pulse signals is generated and then transmitted. The new sequence of pulse signal may be different from the previous sequence in terms of the number of pulses, the peak power level of pulses, or a combination thereof. In some examples, the LiDAR system is adjusted by a human operator that manually changes the configurations of the LiDAR system. In some examples, the LiDAR system is adjusted automatically by one or more processors of the system.

At block 408, the LiDAR system identifies a transmitted pulse signal of the transmitted sequence that corresponds to the selected returned pulse signal. At block 410, the LiDAR system calculates a distance based on the selected returned signal and the identified transmitted signal.

An exemplary process for selecting a returned signal and identifying a transmitted pulse signal that corresponds to the selected returned pulse signal is provided below. In this example, the LiDAR system transmits a sequence of pulse signals including three increasingly strong pulse signals and receives one or more returned signals corresponding to the transmitted sequence.

If the LiDAR system receives only one returned signal that is over the noise level, the system selects the returned signal (assuming the signal is within the dynamic range of the light detector) and determines that the returned signal corresponds to the third/last pulse signal in the transmitted sequence. Accordingly, the system calculates a distance based on the one returned pulse signal and the third pulse signal in the transmitted sequence of pulse signals.

If the LiDAR system receives two returned signals that are over the noise level of the light detector, the system selects the earlier received returned signal of the two (assuming that the earlier signal is within the dynamic range of the light detector) and determines that the selected returned signal corresponds to the second pulse signal in the transmitted sequence. Accordingly, the system calculates a distance based on the earlier received pulse signal and the second pulse signal in the transmitted sequence of pulse signals.

If the LiDAR system receives three returned signals that are over the noise level of the light detector, the system selects the earliest received returned signal of the three (assuming that the earliest signal is within the dynamic range of the light detector) and determines that the selected returned signal corresponds to the first pulse signal in the transmitted sequence. Accordingly, the system calculates a distance comprises calculating a distance based on the earliest received pulse signal and the first pulse signal in the transmitted sequence of pulse signals.

Various exemplary configurations for implementing sequential pulses of light source are disclosed herein. In some embodiments, the LiDAR system uses fiber laser as light source. A fiber laser has its unique advantages, including perfect beam profile, stability from pulse to pulse, eye safety if using 1550 nm wavelength, etc. However, fiber laser also has its disadvantages. For example, the fluorescence time of the active ions in a fiber laser is a few milliseconds, thus preventing the laser from adjusting the power from pulse to pulse. Therefore, the method of increasing the dynamic range by adjusting the laser power cannot be easily implemented in standard fiber lasers. Described below are techniques to generate sequential pulse trains in a fiber laser that provide a practical and efficient way to increase the dynamic range.

Figure 5:
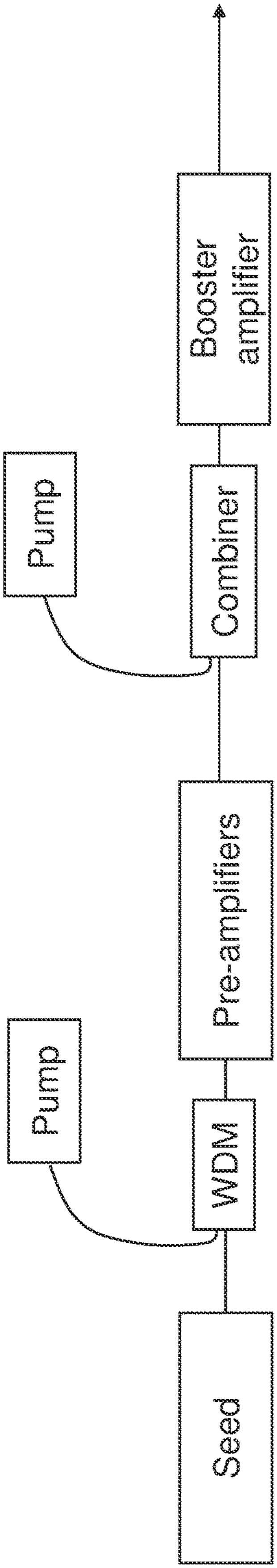
FIG. 5 depicts exemplary schematic of a fiber laser in accordance with some embodiments.

FIG. 5 illustrates an exemplary schematic of fiber lasers. A seed source is amplified by one or more pre-amplifiers and/or booster amplifiers to reach desirable output power. If the system is a nanosecond laser, the seed can be a DFB laser whose pulse duration and repetition rate are controlled by external circuit. If the system is a picosecond laser or shorter, the seed can be a mode locked fiber laser, whose pulse duration and repetition rate are controlled by the laser cavity. The present disclosure discusses nanosecond fiber lasers as examples, but it should be appreciated that the disclosed techniques can be applied to any type of laser.

FIGS. 6A-E illustrate exemplary configurations to implement sequential pulse trains. While each configuration depicted in FIGS. 6A-E generates a 2-pulse sequential pulse train, the configurations can be extended to implement a sequential pulse train with any number of pulses.

Figure 6A:
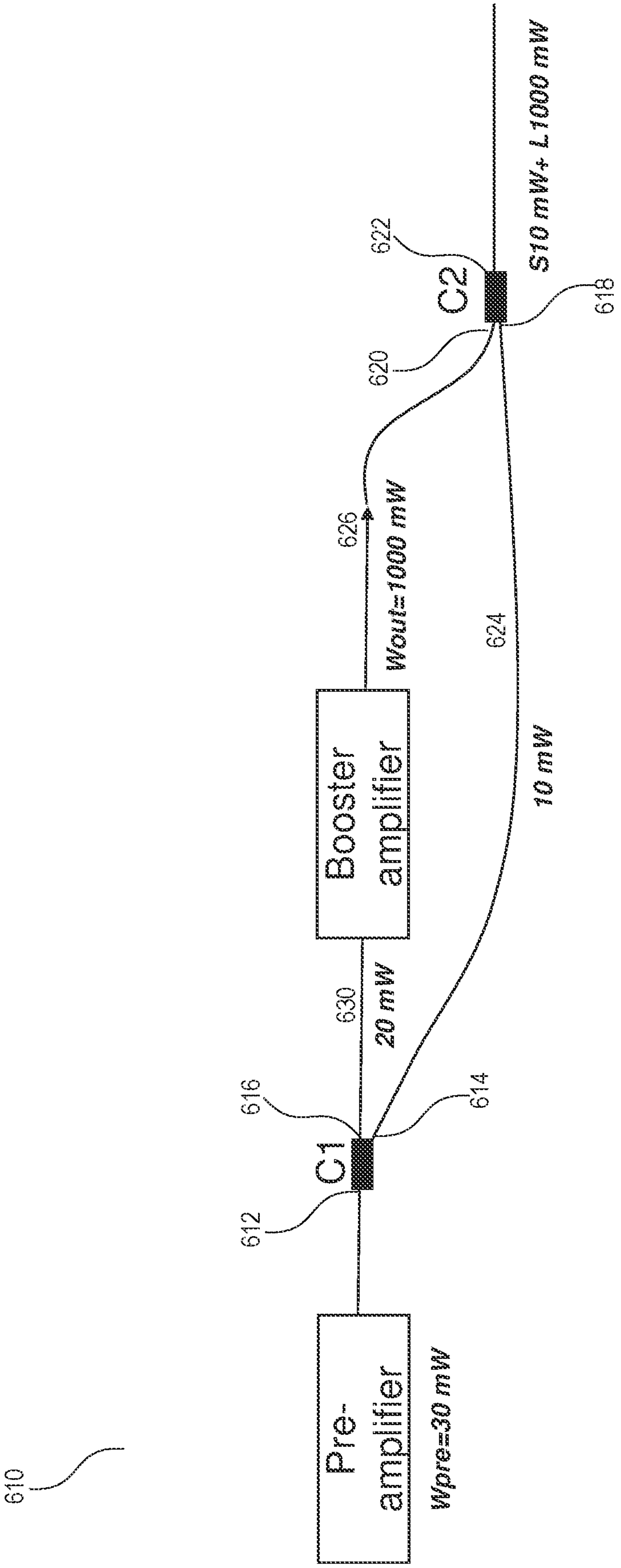
FIG. 6A depicts exemplary configurations for implementing sequential pulses of light source in accordance with some embodiments.

With reference to FIG. 6A, a laser system 610 comprises a laser splitter C1 having an input port 612, a first output port 614, and a second output port 616. The laser splitter is configured to receive a laser beam via the input port 612 (e.g., from a pre-amplifier), and, based on the received laser beam, provide a first split laser beam via the first output port 614 and a second split laser beam via the second output port 616.

The laser system 610 further comprises a laser combiner C2 having a first input port 618, a second input port 620, and an output port 622. The laser combiner is configured to receive the first split laser beam and the second split laser beam via the two input ports and provide, via the output port, a sequence of pulse signals comprising a first pulse signal corresponding to at least a portion of the first split beam and at least a portion of a second pulse signal corresponding to the second split beam.

In some examples, the laser combiner is a coupler having two output ports, one of which is output port 622. Specifically, the coupler is configured to transmit a portion (e.g., 10%) of the first split laser beam to output port 622 and the rest of the first split laser beam to the other output port and transmit a portion of the second split laser beam (e.g., 90%) to the output port 622 and the rest of the second split laser beam to the other output port. In this example, the laser beams outputted via the other output port is discarded. Further, the laser beams outputted via the output port 622 would be a sequence of pulse signals having a first pulse signal corresponding to a portion (e.g., 10%) of the first split beam and a second pulse signal corresponding to a portion (e.g., 90%) of the second split beam.

In some examples, the laser combiner includes a polarization beam splitter. The polarization beam splitter is configured to receive a first beam with a linear polarization and a second beam with a polarization perpendicular to the first beam, combine the first beam and the second beam into a third beam, and providing the third beam to the output port of the laser combiner. Accordingly, provided that the first split laser beam and the second split laser beams are with polarization as described above, the polarization beam splitter can combine the first split laser beam and the second laser beam into a sequence of pulse signals having a first pulse signal corresponding to 100% of the first split beam and a second pulse signal corresponding to 100% of the second split beam.

The laser system 610 further comprises a first fiber 624 configured to relay the first split beam from the first output port 614 of the laser splitter to the first input port 618 of the laser combiner; and a second fiber 626 configured to relay the second split beam from the second output port 616 of the laser splitter to the second input port 620 of the laser combiner. The first fiber and the second fiber are configured to cause a delay to the second split laser beam relative to the first split laser beam. In some examples, the length of the second fiber is longer than the length of the first fiber to introduce the delay. In some examples, the laser system 610 further comprises a pre-amplifier and/or a booster amplifier, as depicted in FIG. 6A.

Specific quantities are provided in FIG. 6A to illustrate an exemplary implementation of a sequential pulse train. As depicted, the power Wpre of the last pre-amplifier is 30 mW and the output power $W_{out}$ of the fiber laser is 1000 mW. The splitter C1 is positioned between the last preamplifier and the booster amplifier to split $W_{pre}$ into two split laser beams. The split laser beam from port 616 has a power level of 20 mW and feeds the booster amplifier to generate 1000 mW output. The split laser beam from port 614 has a power level of 10 mW. The combiner C2 combines the two split beams to form a sequential pulse train. During the combination process, a polarization beam splitter can be used, if the input is polarization maintained. For the case of an un-polarized system, a coupler with a certain ratio (e.g. 90:10) can be used, but at the expense of losing some power. The lengths of fibers 624, 626, and/or 630 can be controlled to define the delay between the small pulse and the large pulse. The pulse intensity ratio between the small pulse and large pulse is approximately 10ˆ2, designed to match the dynamic range of the photodetector. As discussed above, the returned signal corresponding to the small pulse is used to determine the short distance and that corresponding to the large pulse is used to determine the long distance. Using the combination of the two pulses, the final dynamic range can reach 10ˆ2*10ˆ2=10ˆ4.

Figure 6B:
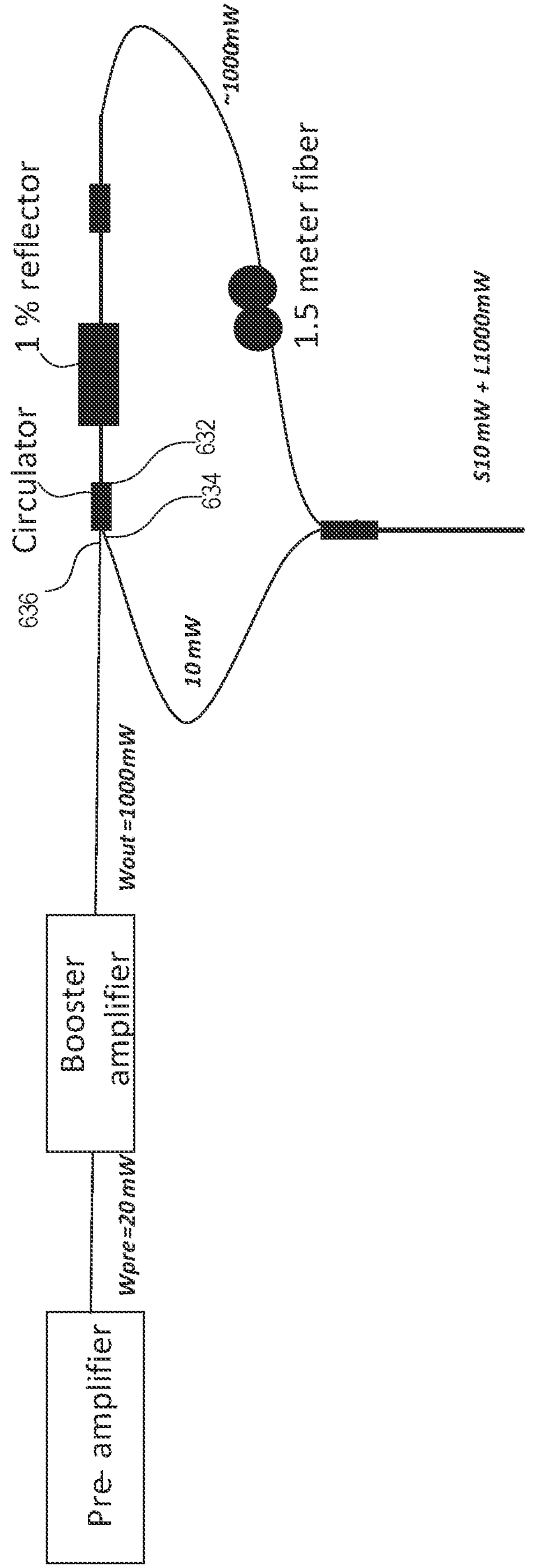
FIG. 6B depicts exemplary configurations for implementing sequential pulses of light source in accordance with some embodiments.
Figure 6C:
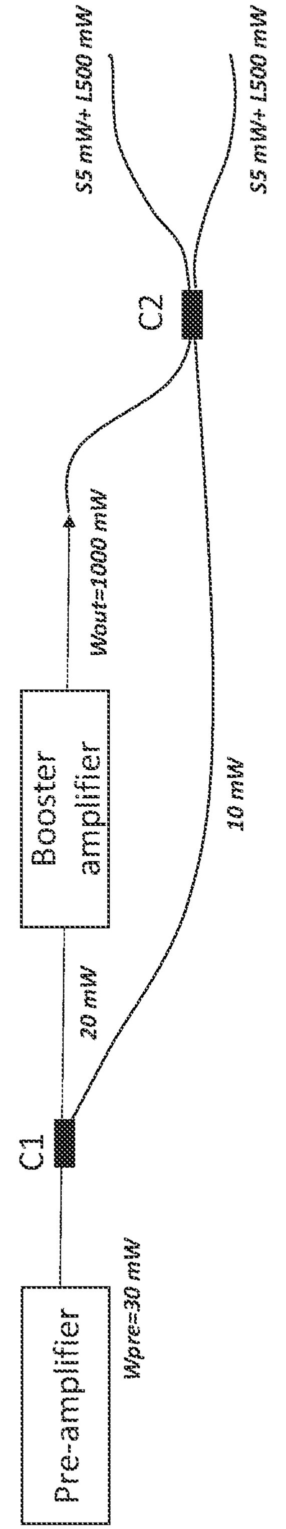
FIG. 6C depicts exemplary configurations for implementing sequential pulses of light source in accordance with some embodiments.
Figure 6D:
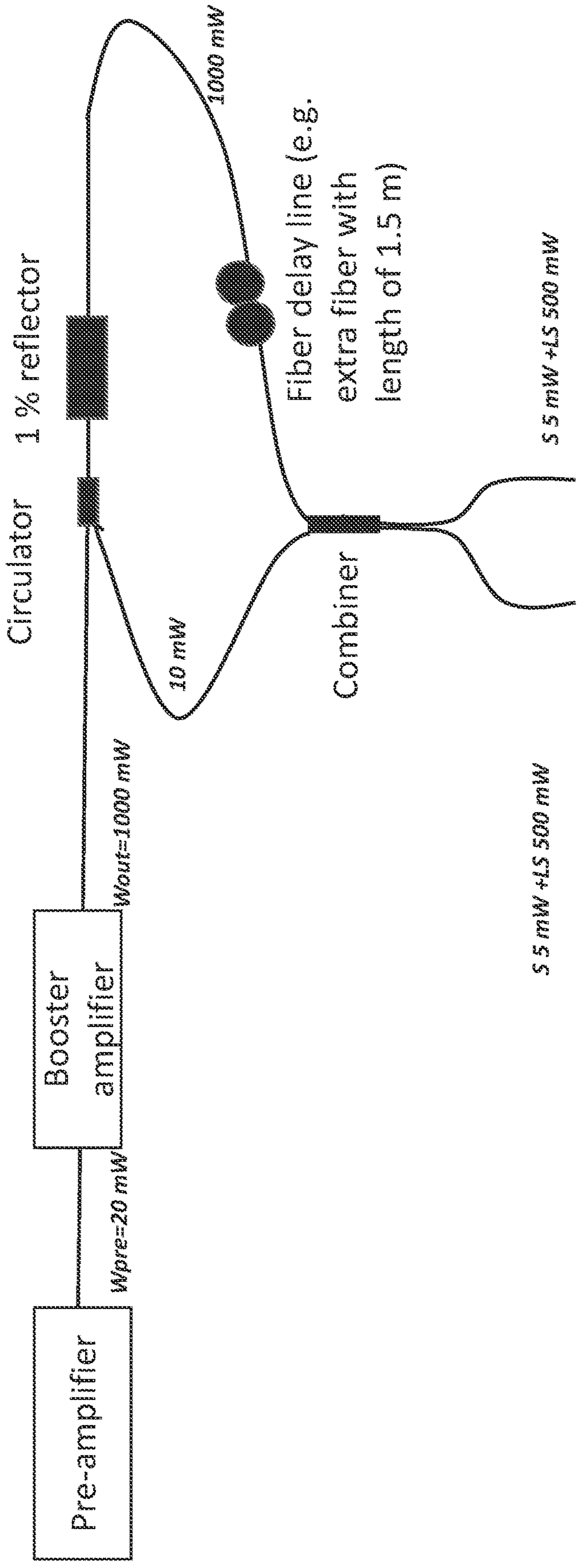
FIG. 6D depicts exemplary configurations for implementing sequential pulses of light source in accordance with some embodiments.

In some examples, the laser splitter is implemented using a circulator and a reflector. FIG. 6B illustrates another exemplary configuration to implement a sequential pulse train. As depicted, a circulator is used after the booster amplifier. The circulator is configured to receive the laser beam via input port 636 and provide, via output port 632 of the circulator, the received laser beam to an input port of a partial reflector. The partial reflector (e.g. 1% reflector) reflects a small amount (e.g., 1%) of the pulse back to the circulator. The circulator is direction-aware and is configured to propagate any laser beam traveling into the output port 632 via port 634. The remaining portion of the pulse (i.e., not reflected by the reflector) is outputted by the reflector.

A combiner similar to the one in FIG. 6A combines the small pulse from port 634 and the large pulse leaving the circulator. The intensity ratio between the large pulse and the small pulse can be controlled by the reflectivity of the reflector. The fiber lengths in the configuration (e.g., from port 634 and port 632) are controlled to determine the delay between the small pulse and large pulse. If a 1% reflector is used, the intensity ratio of the large pulse and small pulse is about 10ˆ2, matching a photodetector whose dynamic range is 10ˆ2. The final dynamic range is 10ˆ4, like the technique described with respect to FIG. 6A.

In some examples, the LiDAR system includes a laser combiner having a first input port, a second input port, and two output ports; and the laser combiner is configured to provide, via the two output ports, two sequences of pulse signals. FIGS. 5C-D illustrate two exemplary configurations to implement sequential pulse trains for a system with two laser beam as light sources. As depicted, a 50:50 coupler is used to combine the small beam with the large beam. At the output of the coupler, each of the two ports obtains 50% of the large beam and 50% of small beam. Accordingly, for a fiber laser having an output power of 1000 mW, two laser sources, each of which contains a small pulse (5 mW) and large pulse (500 mW), are provided as light sources.

Figure 7:
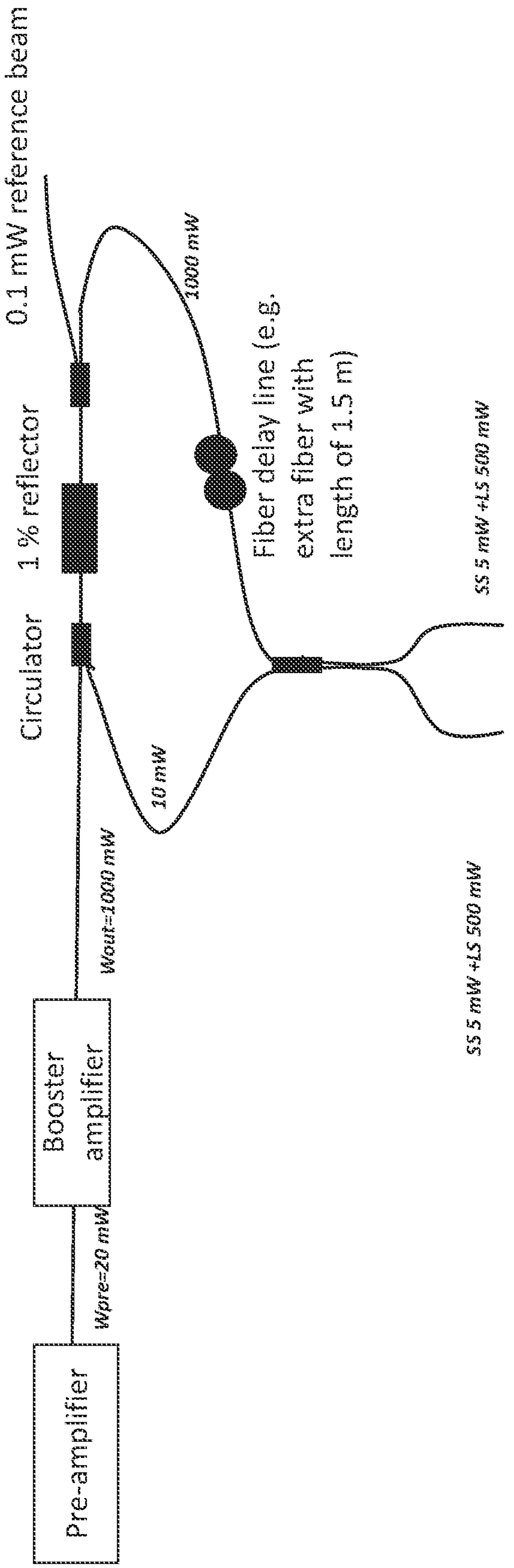
FIG. 7 depicts an exemplary configuration for implementing a reference beam with the sequential pulses in accordance with some embodiments.

To determine the distance of objects with high precision of a few centimeters, a reference beam is needed for analysis. Additional description of improving precision of a LiDAR system is provided in U.S. Provisional Patent Application 62/529,955, "2D SCANNING HIGH PRECISION LiDAR USING COMBINATION OF ROTATING CONCAVE MIRROR AND BEAM STEERING DEVICES," which is hereby incorporated by reference in its entirety. A reference beam (e.g. in a fiber laser) can be provided by a coupler, as seen in FIG. 7. A small portion of the main pulse is propagated into reference arm via a coupler and recorded by the light detector. The pulse shape and beam profile of the reference signal are identical to the transmitted sequence of pulse signals. By analyzing the pulse shapes of the reference beam and the returned signals, distances between objects and LiDAR system can be more precisely calculated.

In some examples, the reference beam is provided to the light detector of the LiDAR system and the system causes a delay between the providing of the reference signal and the transmitting of the sequence of pulse signals such that the measured signal of the reference beam does not interfere with any of the returned signals. For example, the fiber length of the reference arm is arranged to cause such delay. The system takes the delay into consideration (e.g., by correcting the delay using software) when calculating the distance based on the reference signal and the returned signal(s).

It is important for a LiDAR system to distinguish its own signal from those of others by encoding and de-coding techniques. Implementing sequential pulse trains can provide such an encoding and decoding function. By using different delays among pulses and different amplitude rates among pulses, a LiDAR system is associated a unique signature and can distinguish itself from the others accordingly. For example, after the LiDAR system transmits a sequence of pulse signals, the system may receive a plurality of returned signals in the dynamic range of the light detector. However, only some of the returned signals result from the transmitted sequence being scattered by objects. The LiDAR system can identify a subset of the plurality of returned signals as corresponding to the transmitted sequence of pulse signals based on known delays between neighboring pulse signals in the transmitted sequence of pulse signals. Additionally or alternatively, the LiDAR system can identify a subset of the plurality of returned signals as corresponding to the transmitted sequence of pulse signals based on known amplitude differences between neighboring pulse signals in the transmitted sequence of pulse signals.

To implement different delays, one can adjust the length of the fiber delay line in FIG. 7, in some examples. To implement different amplitude ratio, one can adjust the reflecting ratio of the reflector in FIG. 7, in some examples. Further, one or more power ratios between the neighboring pulses in a sequence are set to be lower than the dynamic range of the light detector such that the system can receive multiple returned signals within the dynamic range of the light detector, thus obtaining the delays between these returned signals to be used in the above-described analysis.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-implemented method for expanding a dynamic range of a light detector of a light detection and ranging (LiDAR) scanning system, the method comprising:

receiving, using the light detector of the LiDAR scanning system configured to scan a plurality of transmitted pulse signals, one or more returned pulse signals corresponding to a plurality of transmitted pulse signals, wherein at least two of the plurality of transmitted pulse signals have different power levels and are sent to the same object;

selecting a returned pulse signal from the one or more returned pulse signals by identifying the last received non-saturated returned pulse signal in time from the one or more returned pulse signals formed based on the plurality of transmitted pulse signals, wherein the last received non-saturated returned pulse signal is the timing-wise final returned pulse signal of the one or more returned pulse signals lower than a threshold of saturation, wherein the selected returned pulse signal is within the dynamic range of the light detector;

identifying a transmitted pulse signal of the plurality of transmitted pulse signals that corresponds to the last received non-saturated returned pulse signal; and calculating a distance based on the last received non-saturated returned pulse signal and the identified transmitted pulse signal.

2. The method of claim 1, wherein a power ratio between two neighboring pulse signals of the plurality of transmitted pulse signals does not exceed the dynamic range of the light detector.

3. The method of claim 1, wherein the selected returned pulse signal is a first returned pulse signal, wherein the one or more returned pulse signals further comprise a second returned pulse signal that exceeds the dynamic range of the light detector.

4. The method of claim 1, wherein the one or more returned pulse signals are above a noise level of the light detector.

5. The method of claim 1, wherein selecting a returned pulse signal from the one or more returned pulse signals comprises:

determining that there is only one returned pulse signal corresponding to the plurality of transmitted pulse signals and above a noise level of the light detector.

6. The method of claim 1, wherein the plurality of transmitted pulse signals is a first plurality of transmitted pulse signals and the one or more returned pulse signals are first returned pulse signals, the method further comprising:

receiving one or more second returned pulse signals corresponding to a second plurality of transmitted pulse signals;

determining that none of the one or more second returned pulse signals are within the dynamic range of the light detector; and after the determination, transmitting a third plurality of transmitted pulse signals, the third plurality of transmitted pulse signals being different from the second plurality of transmitted pulse signals in one or more of: a number of pulses, a peak power level of pulses, or a combination thereof.

7. The method of claim 1, wherein the plurality of transmitted pulse signals forms a sequence of transmitted pulse signals having increasingly greater power levels.

8. The method of claim 7, wherein the selected returned pulse signal is the only returned pulse signal of the one or more returned pulse signals that is above a noise level of the light detector.

9. The method of claim 7, wherein the one or more returned pulse signals comprise two or three returned pulse signals above a noise level, wherein the earliest received returned pulse signal of the two or three returned pulse signals is the selected returned pulse signal.

10. The method of claim 1, wherein the plurality of transmitted pulse signals are encoded using different delays among at least some neighboring transmitted pulse signals of the plurality of transmitted pulse signals.

11. The method of claim 10, further comprising:

decoding, based on the different delays, a plurality of returned pulse signals to identify the one or more returned pulse signals corresponding to the plurality of transmitted pulse signals.

12. The method of claim 11, further comprising discarding, based on decoding results, returned signals associated with one or more other LiDAR system.

13. The method of claim 1, wherein the plurality of transmitted pulse signals are configured to have power level differences among at least some neighboring transmitted pulse signals of the plurality of transmitted pulse signals.

14. The method of claim 13, further comprising:

decoding, based on the power level differences, a plurality of returned pulse signals to identify the one or more returned pulse signals corresponding to the plurality of transmitted pulse signals.

15. The method of claim 1, further comprising:

providing a reference signal to the light detector, wherein calculating the distance is further based on a delay between the providing of the reference signal and transmitting of the plurality of transmitted pulse signals.

16. A light detection and ranging (LiDAR) scanning system configured to scan a plurality of transmitted pulse signals, comprising:

a light detector operative to receive one or more returned pulse signals corresponding to a plurality of transmitted pulse signals, wherein at least two of the plurality of transmitted pulse signals have different power levels and are sent to the same object;

a memory; and one or more processors configured to:

select a returned pulse signal from the one or more returned pulse signals by identifying the last received non-saturated returned pulse signal in time from the one or more returned pulse signals formed based on the plurality of transmitted pulse signals, wherein the last received non- saturated returned pulse signal is the timing-wise final returned pulse signal of the one or more returned pulse signals lower than a threshold of saturation, wherein the selected returned pulse signal is within a dynamic range of the light detector;

identify a transmitted pulse signal of the plurality of transmitted pulse signals that corresponds to the last received non-saturated returned pulse signal; and calculate a distance based on the last received non-saturated returned pulse signal and the identified transmitted pulse signal.

17. The system of claim 16, wherein a power ratio between two neighboring pulse signals of the plurality of transmitted pulse signals does not exceed the dynamic range of the light detector.

18. The system of claim 16, wherein the selected returned pulse signal is a first returned pulse signal, wherein the one or more returned pulse signals further comprise a second returned pulse signal that exceeds the dynamic range of the light detector.

19. The system of claim 16, wherein the one or more returned pulse signals are above a noise level of the light detector.

20. The system of claim 16, wherein the one or more processors are configured to select a returned pulse signal from the one or more returned pulse signals by:

determining that there is only one returned pulse signal corresponding to the plurality of transmitted pulse signals and above a noise level of the light detector.

21. The system of claim 16, wherein the plurality of transmitted pulse signals is a first plurality of transmitted pulse signals and the one or more returned pulse signals are first returned pulse signals, the light detector being operative to:

receive one or more second returned pulse signals corresponding to a second plurality of transmitted pulse signals; and the one or more processors being further configured to:

determine that none of the one or more second returned pulse signals are within of the dynamic range of the light detector, and after the determination, transmit a third plurality of transmitted pulse signals, the third plurality of transmitted pulse signals being different from the second plurality of transmitted pulse signals in one or more of: a number of pulses, a peak power level of pulses, or a combination thereof.

22. The system of claim 16, wherein the plurality of transmitted pulse signals forms a sequence of transmitted pulse signals having increasingly greater power levels.

23. The system of claim 22, the selected returned pulse signal is the only returned pulse signal of the one or more returned pulse signals that is above a noise level of the light detector.

24. The system of claim 22, wherein the one or more returned pulse signals comprise two or three returned pulse signals above a noise level, wherein the earliest received returned pulse signal of the two or three returned pulse signals is the selected returned pulse signal.

25. The system of claim 16, wherein the one or more processors are further configured to encode the plurality of transmitted pulse signals using different delays among at least some neighboring transmitted pulse signals of the plurality of transmitted pulse signals.

26. The system of claim 25, wherein the one or more processors are further configured to:

decode, based on the different delays, a plurality of returned pulse signals to identify the one or more returned pulse signals corresponding to the plurality of transmitted pulse signals.

27. The system of claim 26, wherein the one or more processors are further configured to discard, based on decoding results, returned signals associated with one or more other LiDAR system.

28. The system of claim 16, wherein the plurality of transmitted pulse signals are configured to have power level differences among at least some neighboring transmitted pulse signals of the plurality of transmitted pulse signals.

29. The system of claim 28, wherein the one or more processors are further configured to:

decode, based on the power level differences, a plurality of returned pulse signals to identify the one or more returned pulse signals corresponding to the plurality of transmitted pulse signals.

30. The system of claim 16, wherein the one or more processors are configured to calculate the distance based further on a delay associated with a reference signal and the plurality of transmitted pulse signals.

31. A computer-implemented method for expanding a dynamic range of a light detector of a light detection and ranging (LiDAR) system, the method comprising:

receiving, using the light detector of the LiDAR system, one or more returned pulse signals corresponding to a plurality of transmitted pulse signals forming a sequence, wherein at least two of the plurality of transmitted pulse signals within the sequence have different power levels and are sent to the same object;

selecting a returned pulse signal from the one or more returned pulse signals by identifying the last received non-saturated returned pulse signal in time from the one or more returned pulse signals formed based on the plurality of transmitted pulse signals, wherein the last received non-saturated returned pulse signal is the timing-wise final returned pulse signal of the one or more returned pulse signals lower than a threshold of saturation, wherein the selected returned pulse signal is within the dynamic range of the light detector;

identifying a transmitted pulse signal of the plurality of transmitted pulse signals that corresponds to the last received non-saturated returned pulse signal; and calculating a distance based on the last received non-saturated returned pulse signal and the identified transmitted pulse signal.

32. A light detection and ranging (LiDAR) system, comprising:

a light detector operative to receive one or more returned pulse signals corresponding to a plurality of transmitted pulse signals forming a sequence, wherein at least two of the plurality of transmitted pulse signals within the sequence have different power levels and are sent to the same object;

a memory; and one or more processors configured to:

select a returned pulse signal from the one or more returned pulse signals by identifying the last received non-saturated returned pulse signal in time from the one or more returned pulse signals formed based on the plurality of transmitted pulse signals, wherein the last received non-saturated returned pulse signal is the timing-wise final returned pulse signal of the one or more returned pulse signals lower than a threshold of saturation, wherein the selected returned pulse signal is within a dynamic range of the light detector;

identify a transmitted pulse signal of the plurality of transmitted pulse signals that corresponds to the last received non-saturated returned pulse signal; and calculate a distance based on the last received non-saturated returned pulse signal and the identified transmitted pulse signal.

* * * * *